(12) United States Patent
Harris et al.

(10) Patent No.: US 7,729,696 B2
(45) Date of Patent: Jun. 1, 2010

(54) METHOD AND APPARATUS FOR ACCESSING A WIRELESS COMMUNICATION NETWORK

(75) Inventors: John M. Harris, Chicago, IL (US); Sean S. Kelley, Barrington, IL (US); Kris K. Martinovich, Streamwood, IL (US); Joseph R. Schumacher, Glen Ellyn, IL (US)

(73) Assignee: Motorola, Inc., Schaumburg, IL (US)

( * ) Notice: Subject to any disclaimer, the term of this patent is extended or adjusted under 35 U.S.C. 154(b) by 924 days.

(21) Appl. No.: 11/436,459

(22) Filed: May 18, 2006

(65) Prior Publication Data

US 2006/0268768 A1  Nov. 30, 2006

Related U.S. Application Data

(60) Provisional application No. 60/685,043, filed on May 26, 2005.

(51) Int. Cl.
*H04W 4/00* (2009.01)

(52) U.S. Cl. .................. 455/432.3; 455/453; 455/450

(58) Field of Classification Search .............. 455/432.3, 455/453, 450
See application file for complete search history.

(56) References Cited

U.S. PATENT DOCUMENTS

| | | | |
|---|---|---|---|
| 5,752,193 A * | 5/1998 | Scholefield et al. ...... | 455/452.2 |
| 5,862,452 A * | 1/1999 | Cudak et al. ................. | 725/81 |
| 6,594,240 B1 | 7/2003 | Chuah et al. | |
| 6,597,675 B1 | 7/2003 | Esmailzadeh et al. | |
| 6,614,771 B1 | 9/2003 | Kim et al. | |
| 6,615,050 B1 | 9/2003 | Tiedemann, Jr. et al. | |
| 6,987,982 B2 * | 1/2006 | Willenegger et al. ........ | 455/515 |
| 2001/0033579 A1 | 10/2001 | Nelson, Jr. et al. | |
| 2002/0154653 A1 | 10/2002 | Benveniste | |
| 2002/0163933 A1 | 11/2002 | Benveniste | |
| 2004/0032877 A1 * | 2/2004 | Chuah et al. ................ | 370/444 |
| 2004/0146019 A1 * | 7/2004 | Kim et al. ................... | 370/329 |
| 2004/0165529 A1 * | 8/2004 | Lee ............................. | 370/230 |

FOREIGN PATENT DOCUMENTS

WO  WO 01/63839 A2  8/2001

\* cited by examiner

*Primary Examiner*—Barry W Taylor
(74) *Attorney, Agent, or Firm*—Steven A. May

(57) ABSTRACT

A communication system is provided that minimizes access message collisions when multiple mobile stations attempt to access a network after updating configuration information and/or access parameters information via a same overhead message by providing for each such mobile station to determine whether, or when, to convey an access message based on a time period corresponding to a wait for the overhead message by the mobile station.

32 Claims, 5 Drawing Sheets

METHOD AND APPARATUS FOR ACCESSING A WIRELESS COMMUNICATION NETWORK

CROSS-REFERENCE(S) TO RELATED APPLICATION(S)

The present application claims priority from provisional application Ser. No. 60/685,043, entitled "METHOD AND APPARATUS FOR ACCESSING A WIRELESS COMMUNICATION NETWORK," filed May 26, 2005, which is commonly owned and incorporated herein by reference in its entirety.

FIELD OF THE INVENTION

The present invention relates generally to wireless communication systems, and, in particular, to setting up a call in a wireless communication network.

BACKGROUND OF THE INVENTION

In order for a mobile station (MS) to operate in a High Rate Packet Data (HRPD) or a CDMA 2000 3G1X communication system, the MS must first obtain configuration information and access parameters information associated with the system, typically by capturing one or more overhead messages, such as an Access Parameters Message (APM) and/or a Sector Parameters Message (SPM), that is broadcast over a forward link control channel. The overhead message further includes a sequence number corresponding to a version of the information included in the message. Whenever the network changes any of the configuration information or access parameters information in the overhead message, the network indicates the change by updating the associated sequence number in all messages that carry the associated sequence number.

When an MS activates in a HRPD or a CDMA 2000 3G1X system, or roams into an associated network, the MS captures the overhead messages and obtains the current configuration information, access parameters information, and sequence numbers from the overhead messages. The MS then stores the captured configuration information, access parameters information, and sequence numbers in a memory of the MS. When the MS subsequently determines to attempt to access the network, that is, to originate a call or to respond to a page, the MS conveys an access probe to the network. However, sometimes, prior to conveying the access probe, the MS must first confirm that the configuration information and access parameters information maintained by the MS are up-to-date. In order to confirm the currency of the maintained information, the MS tunes to a forward link control channel and checks a sequence number of an overhead message. If the sequence number does not match the value maintained by the MS, then the MS realizes that it must update one or more of the configuration information and/or access parameters information stored by the MS and listens for one or more new overhead messages with the updated sequence number(s). Upon receiving the new overhead message(s), the MS updates the stored configuration information and/or access parameters information. The MS may then proceed to convey the access probe to the network via an access channel.

In addition, there may be overhead messages that do not include a sequence number corresponding to a version of the information included in the message, such as a ANSI-41 RAND Message (RANDM) in CDMA 2000 3G1X. When the system requires that the MS be authenticated prior to providing the MS access to a network of the system, the RANDM includes a global token that is a part of the access parameters information used by the MS to authenticate itself. In this case, the MS must always receive the RANDM before it may proceed to convey the access probe to the network via an access channel, regardless of the sequence number values for configuration information and access parameters information.

Current standards provide for an MS to perform a persistence test before actually transmitting on the access channel during an access channel cycle. The persistence test is based on a persistence value (PSIST) broadcast via an overhead channel and stored by each MS tuned to the overhead channel. In performing the persistence test, the MS generates a random number and compares the random number to the broadcast persistence value. If the random number is less than the persistence value, then the persistence test is deemed to be successful and the MS attempts to transmit on the access channel during a corresponding access channel cycle. If the random number is equal to or greater than the persistence value, then the persistence test is deemed to be unsuccessful and the MS holds off transmitting and repeats the persistence test during a next access channel cycle.

A particular overhead message may be transmitted by a network as infrequently as every 1.28 seconds and the supervision time interval for all system parameters messages may be as long as 5.12 seconds. When the network updates any of the network's configuration information and/or access parameters information, the update is reflected in an updated sequence number and all MSs seeking to originate a message or respond to a page will obtain such updated information via one or more subsequent overhead messages and then attempt to access the network via the access channel. The longer the period between an overhead message, the greater the number of MSs that are likely to determine to originate a connection or respond to a page in a time period substantially immediately after the last required overhead message. The persistence value, and correspondingly the persistence test, is insensitive to a number of MSs simultaneously attempting to access the access channel. As a result, the greater the number of MSs that simultaneously seek to access the network after capturing a same overhead message and updating their configuration information and/or access parameters information, the greater the likelihood of collisions as multiple MSs successfully perform a persistence test and attempt to access the access channel during a same access channel cycle. With a possible wait for an overhead message of 1.28 seconds after determining to originate a message or to respond to a page, or an average wait of 0.6 seconds, followed by a transmission of an access probe, a collision of the access probe with other access probes and a determination that the access probe was unsuccessful, and a retransmission of the access probe, the delay in call set up can become significant.

Therefore, a need exists for a method and apparatus that reduces a likelihood of access probe collisions when multiple MSs attempt to access a network after updating configuration information and/or access parameters information via a same overhead message.

DETAILED DESCRIPTION OF THE INVENTION

Figure 1:
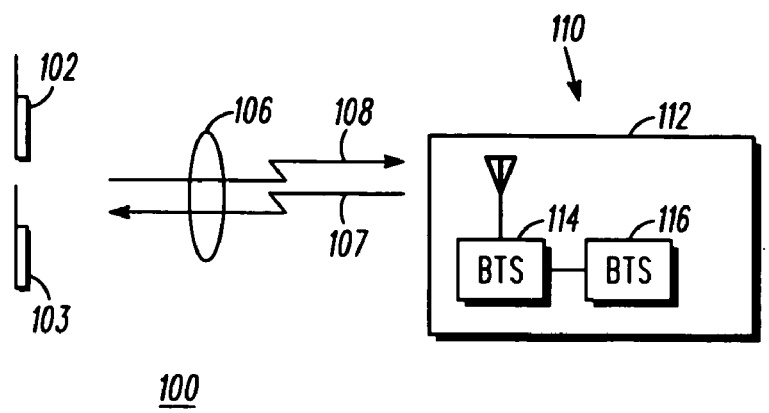
FIG. 1 is a block diagram of a wireless communication system in accordance with an embodiment of the present invention.

To address the need for a method and apparatus that reduces a likelihood of access probe collisions when multiple MSs attempt to access a network after updating configuration information and/or access parameters information via a same overhead message, a communication system is provided that minimizes access message collisions when multiple mobile stations attempt to access a network after updating configuration information and/or access parameters information via a same overhead message by providing for each such mobile station to determine whether, or when, to convey an access message based on a time period corresponding to a wait for the overhead message by the mobile station.

Generally, various embodiments of the present invention encompasses methods for controlling access of a mobile station (MS) to a wireless communication network including determining to convey an access message to a network and determining whether, or when, to convey the access message based on a time period corresponding to a wait for an overhead message.

Another embodiment of the present invention encompasses a method for controlling access of an MS to a wireless communication network including determining to convey an access message to a network and determining when to convey the access message based on a time period corresponding to a wait for an overhead message Yet another embodiment of the present invention encompasses a method for controlling access of an MS to a wireless communication network including determining to convey an access message to a network, executing a persistence test, determining a backoff period, and in response to a successful execution of the persistence test, holding off an initial transmission of the access message until expiration of the backoff period.

Still another embodiment of the present invention encompasses a method for controlling wireless access to a communication network including generating one or more of an access message transmission parameter and an access message backoff parameter and broadcasting the one or more of an access message transmission parameter and an access message backoff parameter in an overhead message, wherein the access message transmission parameter value is used by an MS to scale a random number when executing a persistence test to determine whether to transmit an access message and the access message backoff parameter value is used by an MS to determine a backoff period prior to initially transmitting an access message.

Yet other embodiments of the present invention encompass a mobile station comprising comprising a processor that is configured to determine to convey an access message to a network and to determine whether, or when, to convey the access message based on a time period corresponding to a wait for an overhead message.

Still another embodiment of the present invention encompasses a mobile station comprising a processor that is configured to determine to convey an access message to a network, execute a persistence test, determine a backoff period, and in response to a successful execution of the persistence test, hold off an initial transmission of the access message until expiration of the backoff period.

Yet another embodiment of the present invention encompasses a base station comprising a processor that is configured to generate one or more of an access message transmission parameter and an access message backoff parameter and broadcast the one or more of an access message transmission parameter and an access message backoff parameter in an overhead message, wherein the access message transmission parameter value is used by an MS to scale a random number when executing a persistence test to determine whether to transmit an access message and the access message backoff parameter value is used by an MS to determine a backoff period prior to transmitting an access message.

The present invention may be more fully described with reference to FIGS. 1-6. FIG. 1 is a block diagram of a wireless communication system 100 in accordance with an embodiment of the present invention. Communication system 100 includes multiple mobile stations (MSs) 102, 103 (two shown), such as but not limited to cellular telephones, radiotelephones, wireless communication-enabled personal digital assistants, wireless communication-enabled data terminal equipment, such as a wireless communication-enabled laptop computer, or any other type of portable wireless communication device that is capable of operating in a wireless communication system. Communication system 100 further includes a network 110 comprising a base station (BS) 112 that includes a base transceiver station (BTS) 114 operably coupled to a base station controller (BSC) 116. BS 112 provides communication services to MSs, such as MSs 102 and 103, residing in a coverage area of the BS via an air interface 106. Air interface 106 comprises a forward link 107 having multiple communication channels, such as one or more forward link control channels, one or more forward link traffic channels, and a forward link paging channel, and a reverse link 108 having multiple communication channels, such as one or more reverse link control channels, one or more reverse link traffic channels, and a reverse link access channel.

Figure 2:
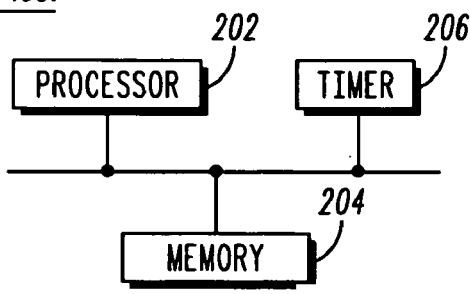
FIG. 2 is a block diagram of an architecture of the mobile station of FIG. 1 in accordance with an embodiment of the present invention.
Figure 3:
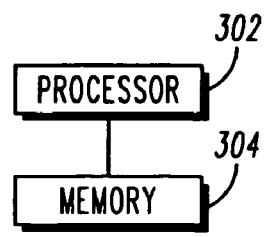
FIG. 3 is a block diagram of an architecture of the base stations of FIG. 1 in accordance with an embodiment of the present invention.

FIGS. 2 and 3 are block diagrams of respective architectures of MSs 102 and 103 and BS 112 in accordance with an embodiment of the present invention. Each of MSs 102 and 103 and BS 112 includes a respective processor 202, 302 such as one or more microprocessors, microcontrollers, digital signal processors (DSPs), combinations thereof or such other devices known to those having ordinary skill in the art. Each of MSs 102 and 103 and BS 112 further includes a respective at least one memory device 204, 304 such as random access memory (RAM), dynamic random access memory (DRAM), and/or read only memory (ROM) or equivalents thereof, that is associated with the respective processor 202, 302 of the MS and BS and that stores data and programs that may be executed by the associated processor and that allows the MS or BS to perform all functions necessary to operate in communication system 100. At least one memory devices 304 further maintains current configuration information, current access parameter information, and a current sequence number associated with network 110, and a random number threshold, preferably a persistence value, and at least one memory devices 204 further maintains configuration information, access parameter information, a random number threshold, preferably a persistence value, and a time threshold value. Each of MSs 102 and 103 further includes a timer 206 that is associated with the processor 202 of the MS.

The embodiments of the present invention preferably are implemented within each of MSs 102 and 103 and BS 112, and more particularly with or in software programs and instructions stored in the at least one memory devices 204, 304 and executed by the processors 202, 302 of the MSs and BS. With respect to BS 112, the functionality described herein as being performed by the BS, and in particular by a processor 302 of the BS, may be performed by a processor of BTS 114 or a processor of BSC 116, or may be distributed among the processors of the BTS and the BSC, based on data and programs correspondingly stored in an at least one memory device of the BTS or BSC. However, one of ordinary skill in the art realizes that the embodiments of the present invention alternatively may be implemented in hardware, for example, integrated circuits (ICs), application specific integrated circuits (ASICs), and the like, such as ASICs implemented in one or more of MSs 102 and 103, BTS 114, and BSC 116. Based on the present disclosure, one skilled in the art will be readily capable of producing and implementing such software and/or hardware without undo experimentation.

Communication system 100 comprises a wireless packet data communication system. In order for an MS to communicate with a BS, each of MSs 102 and 103 and BS 110 operates in accordance with well-known wireless telecommunications protocols. By operating in accordance with well-known protocols, a user of an MS 102, 103 can be assured that the MS will be able to communicate with a serving BS 110 and via, the BS, with the other elements of an associated network. Preferably, communication system 100 comprises one or more of a CDMA (Code Division Multiple Access) 2000 3G1X communication system and a CDMA 2000 High Rate Packet Data (HRPD) communication system that respectively operate in accordance with the 3G1X A.S0011-A.S0017 Inter Operability Specifications (IOSs) standards, which provide a compatibility standard for cellular mobile telecommunications systems that operate as a CDMA 2000 3G1X system, and/or the 3GPP2 A.S0007, A.S0008, and A.S0009 HRPD IOS standards, which provide compatibility standards for cellular mobile telecommunications systems that operate as a CDMA 2000 HRPD system. To ensure compatibility, the standards specify wireless telecommunications system operating protocols, including radio system parameters and call processing procedures. However, those who are of ordinary skill in the art realize that communication system 100 may operate in accordance with any one of a variety of wireless packet-oriented voice communication systems, such as any other CDMS 2000 communication system, a Global System for Mobile communication (GSM) communication system, a Universal Mobile Telecommunication Service (UMTS) communication system, a Time Division Multiple Access (TDMA) communication system, a Frequency Division Multiple Access (FDMA) communication system, or an Orthogonal Frequency Division Multiple Access (OFDM) communication system.

Figure 4A:
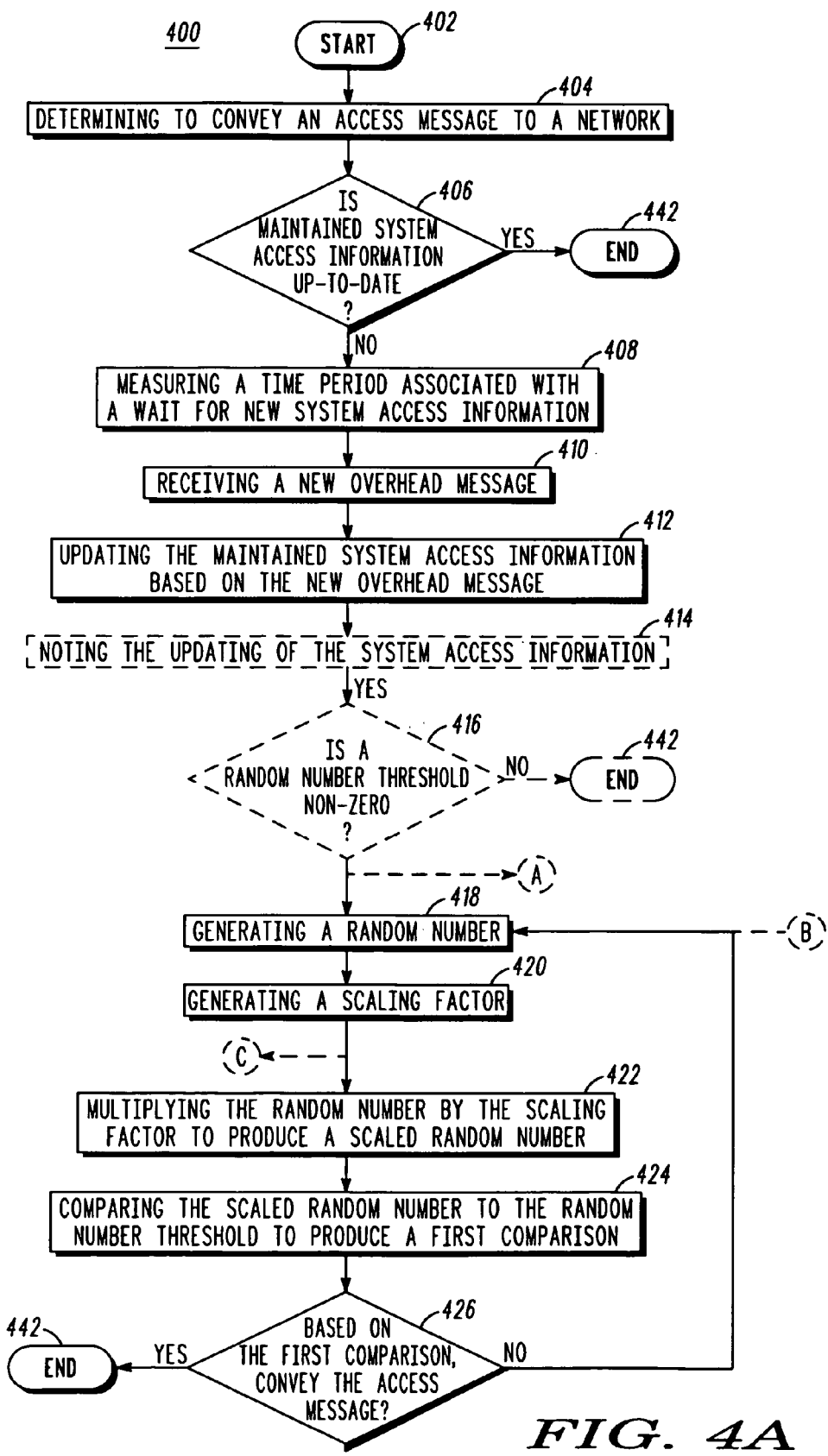
FIG. 4A is a logic flow diagram of an access procedure executed by the communication system of FIG. 1 in accordance with an embodiment of the present invention.
Figure 4B:
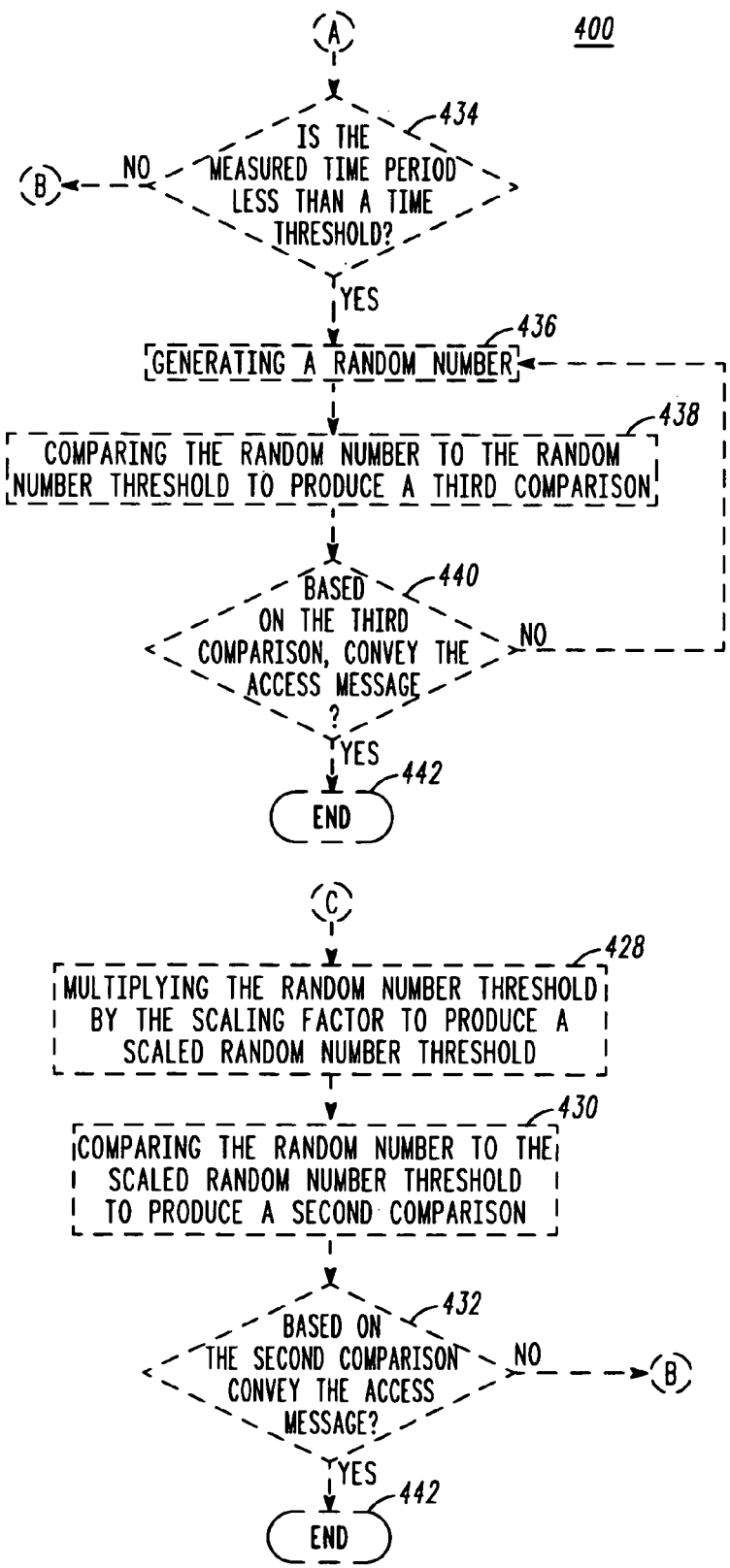
FIG. 4B is a continuation of the logic flow diagram depicted in FIG. 4A of an access procedure executed by the communication system of FIG. 1 in accordance with an embodiment of the present invention.

Referring now to FIGS. 4A and 4B, a logic flow diagram 400 is provided of an access procedure executed by communication system 100 in accordance with an embodiment of the present invention. Logic flow diagram 400 begins (402) when an MS, such as MS 102, determines (404) to convey an access message to BS 112, for example, when the MS determines to originate a call, respond to a page indicating a call for the MS, convey a short data burst (SDB), or convey a short message service (SMS) message. In response to determining to convey the access message, MS 102 determines (406) whether the system access information maintained by the MS, such as configuration information and access parameter information, is up-to-date.

In order to confirm the currency of the system access information maintained by the MS, MS 102 checks a sequence number of an overhead message. For example, in a CDMA 2000 3G1X communication system, MS 102 may tune to a paging channel of forward link 107 and check a configuration message sequence number of a general paging message. By way of another example, in a CDMA High Rate Packet Data (HRPD) communication system, MS 102 may acquire the timing of forward link 107 and receive a Sync message via a forward link control channel. MS 102 may then check a sequence number of an SPM. Based on the sequence number of the overhead message, MS 102 determines whether the system access information maintained by the MS is current. For example, when MS 102 has not yet stored a sequence number, or the sequence number maintained by MS 102 does not match the sequence number included in the overhead message, or based on the overhead message, MS 102 realizes that the MS has moved to a new sector or coverage area that is different from the coverage area or sector associated with a previous paging message received by the MS, then the MS may determine that the MS needs to update the MS's system access information. By way of another example, in a CDMA 2000 3G1X communication system, MS 102 may determine that an overhead message containing system access information, such as the RANDM, is being sent that does not have an associated sequence number. Then, the MS may determine that the MS needs to receive the latest RANDM regardless of the sequence number values.

When MS 102 determines that the sequence number maintained by the MS is up-to-date and corresponds to a same coverage area or sector as the new sequence number, then the MS may note this by setting the update time period parameter value, that is, a LastOverheadParametersUpdateInterval value, to '0'. When MS 102 determines that the sequence number maintained by the MS is no longer current and/or corresponds to a different coverage area or sector than the new sequence number, then the MS listens for a new overhead message with the updated sequence number and further comprising current system access information, such as current configuration information, current access parameters information, and a current random number threshold, typically a persistence value. For example, the new overhead message may comprise an Access Parameters Message (APM) or a Sector Parameters Message (SPM).

Upon receiving (410) the new overhead message, the MS updates (412) the system access information maintained by the MS, such as the configuration information, access parameters information, sequence number, and random number threshold, that is, the persistence value, maintained by the MS. MS 102 may further note (414) the updating of the system access information, preferably by setting an OverheadParametersUpToDate value to '1'. MS 102 further measures (408) a time period during which the MS waits to update its system access information, that is, the time period corresponding to the wait for the new system access information after the MS determines to update its system access information. In one embodiment of the present invention, MS 102 may measure the time period by incrementing a value of an update time period parameter, for example, by incrementing a LastOverheadParametersUpdateInterval value by '1' every paging cycle. In another embodiment of the present invention, MS 102 may measure the time period by reference to timer 206 of the MS and buffering a value associated with the timer in the at least one memory device 204 of the MS.

In response to updating the system access information maintained by the MS, MS 102 then determines whether to convey the access message during a corresponding access channel cycle. In determining whether to convey the access message, MS 102 may optionally determine (416) whether the random number threshold maintained by the MS is non-zero. When the random number threshold is zero, logic flow 400 ends (442). That is, one of ordinary skill in the art realizes that when the random number threshold is zero, an execution of a persistence test, or a modified persistence test as described in detail below, shall be unsuccessful and MS 102 will not transmit an access message during a corresponding access channel cycle.

When the random number threshold is non-zero, MS 102 executes a modified version of a persistence test in order to determine whether to attempt to transmit on the access channel during a corresponding access channel cycle. That is, MS 102 generates (418) a random number and further generates (420) a scaling factor. MS 102 then multiplies (422) the random number by the scaling factor to produce a scaled random number and compares (424) the scaled random number to the random number threshold, that is, the persistence value, to produce a first comparison. Based on the first comparison, MS determines (426) whether to transmit the access message. That is, when the scaled random number is less than the random number threshold, then the test is deemed to be successful and the MS attempts to transmit on the access channel during a corresponding access channel cycle. When the scaled random number is equal to or greater than the random number threshold, then the test is deemed to be unsuccessful and the MS holds off transmitting the access message, returns to step 418, and repeats the test using a re-scaled random number during a next access channel cycle. Logic flow 400 then ends (442).

MS 102 generates the scaling factor based on an access message transmission parameter. Preferably, the access message transmission parameter is broadcast by serving BS 112 to the MS in an overhead message, such as an APM or an SPM comprising system access information, via a signaling channel of forward link 107. However, in another embodiment of the present invention, the access message transmission parameter may be preprogrammed into the at least one memory device 204 of the MS. When the access message transmission parameter is conveyed to MS 102 via an overhead message, the overhead message may further comprise an indicator, such as a MAX_PSIST_INCL value, that indicates whether the overhead message includes the access message transmission parameter value. For example, when the overhead message includes the access message transmission parameter value then the indicator may be set to '1,' and when the overhead message does not include the access message transmission parameter value then the indicator may be set to '0.'

MS 102 generates the scaling factor by adjusting a value of the access message transmission parameter by a factor that is based on a length of, or a value associated with, the measured time period. For example, the access message transmission parameter value may comprise a maximum adjustment that may be applied to the random number, for example, a MAX_PSIST value. In such embodiment of the invention, the scaling factor may be produced by scaling the access message transmission parameter downwards in correspondence with decreases in the measured time period. That is, for a certain length of the time period or longer, the scaling factor may be set equal to the full access message transmission parameter. For shorter time periods, the shorter the time period, the smaller the scaling factor. MS 102 may then multiply the random number by the scaled access message transmission parameter value to produce the scaled random number. However, in another embodiment of the present invention, the scaling factor may be produced by scaling the access message transmission parameter downwards in an inverse relationship to increases in the measured time period. That is, the longer the measured time period, the smaller the scaling factor. A determination of whether to weight longer waiting periods favorably or unfavorably with respect to providing an MS access to the access channel is up to a designer of communication system 100.

For example, when the measured time period is less than a first time value, for example, 0.5 seconds, then the scaling factor may be set equal to zero (that is, the access message transmission parameter value is multiplied by a factor of zero). When the measured time period is greater than a second time value, for example, one (1) second, then the scaling factor may be set equal to the access message transmission parameter value (for example, MAX_PSIST) (that is, the access message transmission parameter value is multiplied by a factor of one). When the measured time period is greater than the first time value and less than the second time value, then the scaling factor may be determined by reducing the access message transmission parameter value in correspondence with decreases in the measured time period, for example, by application of the following formula: 'scaling factor=ROUND[access message transmission parameter value DIV(2)].' However, those who are of ordinary skill in the art realize that the access message transmission parameter value may instead be a minimum value that is scaled upwards based on increasingly long measured time periods or may comprise any value that may be adjusted based on the measured time period.

In another embodiment of the present invention, when performing a modified version of a persistence test, MS 102 may scale the random number threshold, that is, the persistence value, instead of scaling the random number. That is, after executing step 420, logic flow diagram 400 may proceed to step 428, where MS 102 multiplies the random number threshold by the scaling factor to produce a scaled random number threshold. For example, instead of scaling the scaling factor downwards based on shorter time periods, MS 102 may instead scale the threshold upwards. MS 102 then compares (430) the random number to the scaled random number threshold to produce a second comparison. Based on the second comparison, MS determines (432) whether to transmit the access message. That is, when the random number is less than the scaled random number threshold, then the test is deemed to be successful and the MS attempts to transmit on the access channel during a corresponding access channel cycle. When the random number is equal to or greater than the scaled random number threshold, then the test is deemed to be unsuccessful and the MS holds off transmitting the access message, returns to step 418, and repeats the test using a re-scaled random number threshold during a next access channel cycle. Logic flow 400 then ends (442).

In yet another embodiment of the present invention, in order to further target a performance of a modified persistence test to situations where collisions are most likely to occur, MS 102 may perform the modified persistence test only when the measured time period is greater than, or equal to or greater than, a threshold time value. That is, after MS 102 updates, at step 412, the system access information maintained by the MS (and, when appropriate, determines, at step 416, that the random number threshold is non-zero), logic flow diagram 400 may proceed to step 434, where MS 102 further determines whether the measured time period is less than a time threshold value. When the measured time period is greater than, or equal to or greater than, the time threshold, then MS 102 may proceed to step 418 and execute a modified version of a persistence test in determining whether to attempt to transmit on the access channel during a corresponding access channel cycle. When the measured time period is less than the time threshold value, then MS 102 may execute a prior art persistence test, instead of a modified version of a persistence test, in determining whether to attempt to transmit on the access channel during a corresponding access channel cycle. That is, MS 102 may generate (436) a random number and compare (438) the random number to the random number threshold maintained by the MS to produce a third comparison. Based on the third comparison, MS determines (440) whether to transmit the access message. That is, when the random number is less than the random number threshold, then the test is deemed to be successful and the MS attempts to transmit on the access channel during a corresponding access channel cycle. When the random number is equal to or greater than the random number threshold, then the test is deemed to be unsuccessful and the MS holds off transmitting the access message, returns to step 436, and repeats the persistence test during a next access channel cycle. Logic flow 400 then ends (442).

By providing for an MS, such as MSs 102 or 103, to scale a random number, or a random number threshold, based on a time period corresponding to a wait for the overhead message when the MS executes a persistence test, communication system 100 introduces an aspect of customization to the persistence test executed by each MS or multiple MSs that attempt to access a network, such as network 110, after updating configuration information and/or access parameters information via a same overhead message. By providing for such customization, communication system 100 minimizes a likelihood of access message collisions when the multiple MSs determine whether, or when, to access the network. In addition, by providing that an MS may perform a persistence test only when the time period corresponding to a wait for the overhead message is greater than, or equal to or greater than, a threshold time value, communication system 100 further targets a performance of the modified persistence test to situations where collisions are most likely to occur.

Figure 5A:
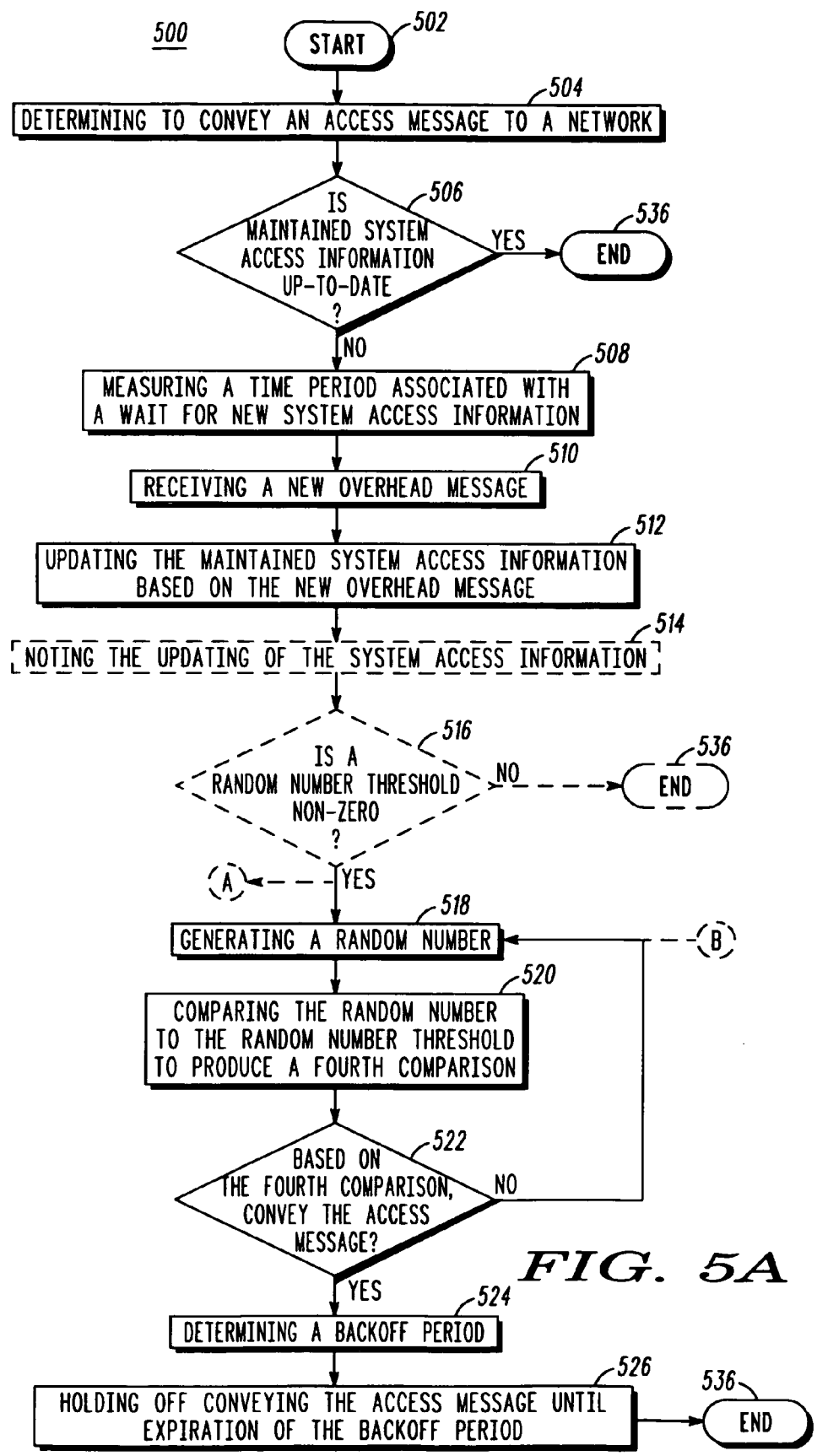
FIG. 5A is a logic flow diagram of an access procedure executed by the communication system of FIG. 1 in accordance with another embodiment of the present invention.
Figure 5B:
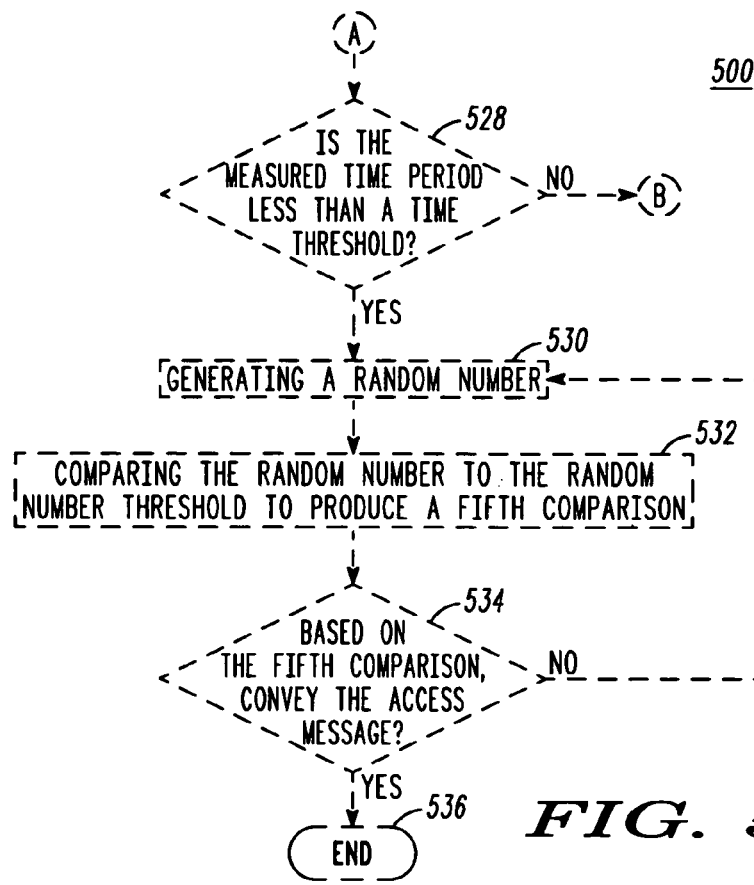
FIG. 5B is a continuation of the logic flow diagram depicted in FIG. 4A of an access procedure executed by the communication system of FIG. 1 in accordance with another embodiment of the present invention.

In still other embodiments of the present invention, in order to minimize a likelihhod of collisions and instead of, or in addition to, modifying the persistence test of the prior art, communication system 100 may implement a backoff period prior to an initial transmission of an access message, which backoff period is based on the time period corresponding to a wait for the overhead message. Referring now to FIGS. 5A and 5B, a logic flow diagram 500 is provided of an access procedure executed by communication system 100 in accordance with another embodiment of the present invention. Similar to logic flow diagram 400, logic flow diagram 500 begins (502) when an MS, such as MS 102, determines (504) to convey an access message to BS 112, for example, when the MS determines to originate a call, respond to a page indicating a call for the MS, convey a short data burst (SDB), or convey a short message service (SMS) message. In response to determining to convey the access message, MS 102 determines (506) whether the system access information maintained by the MS, such as configuration information and access parameter information, is up-to-date.

In order to confirm the currency of the system information maintained by the MS, MS 102 checks a sequence number of an overhead message, for example, a configuration message sequence number of a general paging message in a CDMA 2000 3G1X communication system or a sequence number of an SPM in an HRPD communication system. Based on the sequence number of the overhead message, MS 102 determines whether the system access information maintained by the MS is current. When MS 102 determines that the sequence number maintained by the MS is no longer current and/or corresponds to a different coverage area or sector than the new sequence number, the MS listens for a new overhead message, that is, a new APM or SPM, with the updated sequence number. By way of another example, in a CDMA 2000 3G1X communication system, the MS 102 may determine that an overhead message containing system access information, such as the RANDM, is being sent that does not have an associated sequence number. Then, the MS may determine that the MS needs to receive the latest RANDM regardless of the sequence number values. Upon receiving (510) the new overhead message, the MS updates (512) one or more of the configuration information, access parameters information, sequence number, and random number threshold, that is, the persistence value, maintained by the MS.

MS 102 may further note (514) the updating of the system access information, preferably by setting an OverheadParametersUpToDate value to '1'. MS 102 further measures (508) a time period during which the MS waits to update its system access information, that is, the time period corresponding to the wait for the new system access information after the MS determines to update its system access information. In one embodiment of the present invention, MS 102 may measure the time period by incrementing a value of a update time period parameter, for example, by incrementing a LastOverheadParametersUpdateInterval value by '1'. In another embodiment of the present invention, MS 102 may measure the time period by reference to timer 206 of the MS and buffering a value associated with the timer in the at least one memory device 204 of the MS. MS 102 further listens for a new overhead message such as an Access Parameters Message (APM) or a Sector Parameters Message (SPM), with the updated sequence number.

In response to updating the system access information maintained by the MS, MS 102 then determines whether to convey the access probe during the access channel cycle. MS 102 optionally determines (516) whether the random number threshold, preferably a persistence value, maintained by the MS is non-zero. When the random number threshold is zero, logic flow 500 ends (536). That is, one of ordinary skill in the art realizes that when the random number threshold is zero, an execution of a persistence test, or a modified persistence test, shall be unsuccessful and the MS 102 will not transmit an access message during a corresponding access channel cycle.

When the random number threshold is non-zero, then MS 102 determines whether the MS may transmit an access message in an access slot in accordance with an execution of a persistence test, such as the persistence test of the prior art, and further based on a computation of an additional backoff period. That is, when the random number threshold is non-zero, MS 102 generates (518) a random number and compares (520) the random number to the random number threshold to produce a fourth comparison. Based on the fourth comparison, MS determines (522) whether to transmit the access message. That is, when the random number is less than the random number threshold, then the persistence test is deemed to be successful and the MS attempts to transmit on the access channel during a corresponding access channel cycle. If the random number is equal to or greater than the random number threshold, then the persistence test is deemed to be unsuccessful and the MS holds off transmitting the access message.

When the persistence test is successful and MS 102 determines to transmit the access message, the MS holds off (526) transmitting the access message until expiration of a backoff period that is determined (524) by the MS. When the persistence test is unsuccessful, then MS 102 returns to step 518 from step 522 and re-executes a persistence test. When the re-executed persistence test is deemed to be successful then MS 102 may transmit an access message in an access slot further based on a computation and implementation of a backoff period at steps 524 and 526, which backoff period is based on an access message backoff parameter value as described below and which backoff period is in addition to, or alternatively instead of, any other backoff period (for example, a sequence backoff delay ("RS")) provided by the prior art for a delayed transmission of an access message. Logic flow 500 then ends (536). By holding off transmission of an access message until expiration of a determined backoff period, a potential for collisions of access messages transmitted by multiple mobile stations is minimized.

MS 102 determines the backoff period by multiplying a random number (generated by the MS) by a scaling factor. The scaling factor is based on an access message backoff parameter. Preferably, the access message backoff parameter is broadcast by serving BS 112 to the MS in an overhead message, such as the APM or SPM, via a signaling channel of forward link 107. However, in another embodiment of the present invention, the access message backoff parameter may be preprogrammed into the at least one memory device 204 of the MS. When the access message backoff parameter is conveyed to MS 102 via an overhead message, the overhead message may further comprise an indicator, such as a MAX_ADD_BKOFF_INCL value, that indicates whether the overhead message includes the access message backoff parameter value. For example, when the overhead message includes the access message transmission parameter value then the indicator may be set to '1,' and when the overhead message does not include the access message transmission parameter value then the indicator may be set to '0.'

MS 102 generates the scaling factor by adjusting a value of the access message backoff parameter by a factor that is based on a length of, or a value associated with, the measured time period. For example, the access message transmission backoff parameter value may comprise a maximum adjustment that may be applied to the random number, for example, a MAX_ADD_BACKOFF value. In such embodiment of the invention, the scaling factor may be produced by scaling the access message backoff parameter downwards in correspondence with decreases in the measured time period. That is, for a certain length of the time period or longer, the scaling factor may be set equal to the full access message backoff parameter. For shorter time periods, the smaller the scaling factor. MS 102 may then multiply the random number by the scaled access message backoff parameter value to produce the scaled random number. However, in another embodiment of the present invention, the scaling factor may be produced by scaling the access message backoff parameter downwards in an inverse relationship to increases in the measured time period. That is, the longer the measured time period, the smaller the scaling factor. A determination of whether to weight longer waiting periods favorably or unfavorably with respect to providing an MS access to the access channel is up to a designer of communication system 100.

For example, when the measured time period is less than a first time value, for example, 0.5 seconds, then the scaling factor may be set equal to zero (0), resulting in backoff period equal to zero seconds (that is, the access message backoff parameter value is multiplied by a factor of zero). When the measured time period is greater than a second time value, for example, one (1) second, then the scaling factor may be set to a time period corresponding to the full value of the access message backoff parameter (for example, MAX_ADD_BACKOFF) (that is, the access message backoff parameter value is multiplied by a factor of one). When the measured time period is greater than the first time value and less than the second time value, then the access message backoff parameter may be adjusted by a factor between zero and one. For example, when the measured time period is greater than the first time value and less than the second time value, then the scaling factor may be determined as follows: 'scaling factor=ROUND[access message backoff parameter value DIV(2)].' However, those who are of ordinary skill in the art realize that the access message backoff parameter value may instead be a minimum value that is adjusted upwards based on increasingly long measured time periods or may comprise any value that may be adjusted based on the measured time period.

In another embodiment of the present invention, in order to further target an application of the backoff period to situations where collisions are most likely to occur, MS 102 may apply the backoff period only when the measured time period is greater than, or equal to or greater than, a threshold time value. That is, after MS 102 updates, at step 512, the system access information maintained by the MS, logic flow diagram 500 may proceed to step 528, where MS 102 further determines whether the measured time period is less than a threshold time value. When the random number threshold is non-zero and the measured time period is greater than, or equal to or greater than, the threshold time value, then MS 102 may proceed to step 518 and execute a persistence test and determine a backoff period in determining whether to attempt to transmit on the access channel during a corresponding access channel cycle. When the random number threshold is non-zero and the measured time period is less than the time threshold, then MS 102 may forgo determining a backoff period in determining whether to attempt to transmit on the access channel during a corresponding access channel cycle. That is, when the random number threshold is non-zero and the measured time period is less than the time threshold, MS 102 may generate (530) a random number and compare (532) the random number to a random number threshold to produce a fifth comparison. Based on the fifth comparison, MS determines (534) whether to transmit the access probe. That is, when the random number is less than the random number threshold, then the test is deemed to be successful and the MS attempts to transmit on the access channel during a corresponding access channel cycle. If the random number is equal to or greater than the random number threshold, then the test is deemed to be unsuccessful and the MS holds off transmitting the access message, returns to step 530, and re-executes a persistence test during a next access channel cycle. Logic flow 500 then ends (536).

By providing for an MS, such as MSs 102 or 103, to implement a backoff period based on a time period corresponding to a wait for an overhead message prior to the MS initially transmitting an access message, communication system 100 minimizes a likelihood of access message collisions when multiple MSs attempt to access a network, that is, network 110, after updating configuration information and/or access parameters information via a same overhead message. Further, by providing that the backoff period may be based on a time period corresponding to a wait for an overhead message, communication system 100 provides an aspect of customization in the determination of a backoff period by each MS serviced by the communication system. In addition, by providing that an MS may implement a backoff period only when the time period corresponding to a wait for the overhead message is greater than, or equal to or greater than, a threshold time value, communication system 100 further targets an implementation of a backoff period to situations where collisions are most likely to occur.

Figure 6:
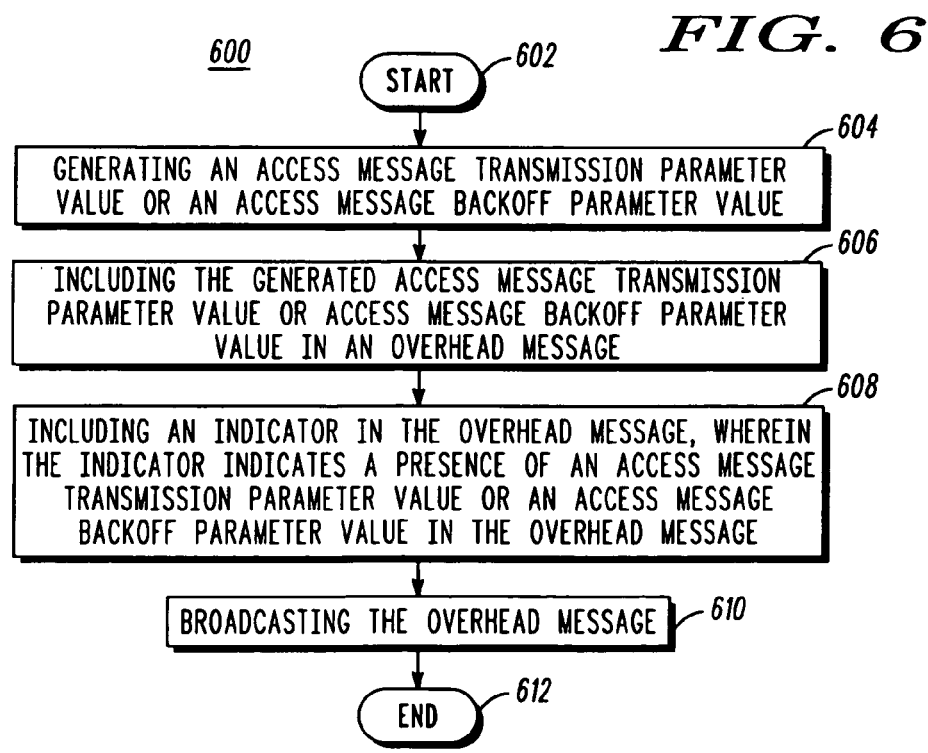
FIG. 6 is a logic flow diagram of a method of controlling wireless access to the communication system network of FIG. 1 in accordance with various embodiments of the present invention.

As noted above, the scaling performed during execution of a persistence test or the determining of a backoff period prior to transmission of an access message may be based on an access message transmission parameter value or an access message backoff parameter value that is broadcast by a base station. Referring now to FIG. 6, a logic flow diagram 600 is depicted that illustrates a method of controlling wireless access to communication network 110 by providing such an access message transmission parameter value or an access message backoff parameter value in accordance with various embodiments of the present invention. Logic flow diagram 600 begins (602) when BS 112 generates (604) an access message transmission parameter value or an access message backoff parameter value (for ease of reference, collectively referred to herein as an access message transmission/backoff parameter value). As noted above, the access message transmission parameter value may be used by an MS, such as MSs 102 and 103, to scale a random number when executing a persistence test in order to determine whether to transmit an access message, and the access message backoff parameter value may be used by an MS to determine a backoff period prior to transmitting the access message upon successful execution of the persistence test or prior to re-executing an unsuccessfully executed persistence test.

BS 112 then includes (606) the access message transmission/backoff parameter value in an overhead message, such as an APM or SPM. BS 112 may further include (608) an indicator, such as a MAX_PSIST_INCL value or a MAX_ADD_BKOFF_INCL value, in the overhead message that indicates whether the overhead message includes the access message transmission/backoff parameter value. For example, when the overhead message includes the access message transmission/backoff parameter value then the indicator may be set to '1,' and when the overhead message does not include the access message transmission/backoff parameter value then the indicator may be set to '0. BS 112 then broadcasts (610) the overhead message via a signaling channel of forward link 107, and logic flow 600 then ends (612).

BS 112 may determine the access message transmission/backoff parameter value based on a number of MSs serviced by BS 112, a quantity of access channels, such as an ACH (Access Channel) or an EACH (Enhanced Access Channel), in air interface 106, or a quantity of access channel slots in air interface 106 that may be used for transmission of access messages. For example, the larger the number of serviced MSs, quantity of access channels, or quantity of access channel slots, the larger the access message transmission/backoff parameter value. BS 112 may further determine the access message transmission/backoff parameter value based on a location of the MSs serviced by BS, a quantity of high velocity MSs serviced by the BS, and/or one or more geographic dimensions of the coverage area serviced by BS 112, such as a radius of the coverage area, which geographic dimensions may be determined based on the locations of the MSs. There are many well-known techniques for locating an MS, for example, based a direction of arrival or times of arrival of signals received by one or more BSs from the MS when he MS is operating in a soft handoff mode, and any such technique may be used herein without departing from the spirit and scope of the present invention. For example, the more dispersed the MSs or the larger the geographic dimensions of the coverage area serviced by BS 112, the smaller the access message transmission/backoff parameter value.

BS 112 may further determine the access message transmission/backoff parameter value based on a load of air interface 106 or a congestion of air interface 106. For example, the heavier the load or the congestion of air interface 106, the larger the access message transmission/backoff parameter value. For example, a load of an air interface 106 may correspond to a quantity of channels assigned by BS 112 to MSs serviced by the BS, or may correspond to a quantity of channels available for assignment. By way of another example, a congestion of air interface 106 may be determined based on a quality metric associated with air interface 106. In one such embodiment, MS 102 may monitor a pilot channel or other common or dedicated channels of air interface 106 and determine a quality metric with respect such monitored signals, such as a as a frame error rate (FER), a bit error rate (BER), a signal-to-noise ratio (SNR), a carrier-to-interference (C/I) ratio, or a signal strength of such signals. MS 102 then may convey the quality metric back to serving BS 112. Alternatively, BS 112 may determine a quality metric, such as an FER, a BER, an SNR, a C/I, or a signal strength with respect to signals received from the MS. BS 112 may then determine a congestion of air interface based on the quality metric, for example, by comparing the determined quality metric to one or more quality metric thresholds, wherein each threshold corresponds to a different level of congestion. BS 112 may further determine the access message transmission/backoff parameter value based on whether MS 102 is capturing the overhead message comprising the new system parameters due to an idle handoff.

By providing for an MS, such as MS 102, to scale a random number or a random number threshold based on a time period corresponding to a wait for an overhead message and when executing a persistence test, or to implement a backoff period based on such a time period, prior to transmitting an initial access message, communication system 100 minimizes a likelihood of access message collisions when multiple MSs attempt to access a network, that is, network 110, after updating configuration information and/or access parameters information via a same overhead message. Communication system 100 provides for a broadcast of an access message transmission parameter value or an access message backoff parameter value to each such MS by a BS, that is, BS 112, which access message transmission parameter value or an access message backoff parameter value may be used by the MS to respectively scale the random number or a random number threshold or to determine the backoff period. In turn, the BS may determine the access message transmission parameter value or an access message backoff parameter value based on one or more of a load of an air interface, that is, air interface 106, a congestion of the air interface, a quantity of access channels in the air interface, a quantity of MSs located in a same coverage area as the MS, that is MS 102, a quantity of access channel slots available, a geographic dimension of a coverage area (associated with the BS), and whether the coverage area comprises multiple high velocity MSs. By determining the access message transmission parameter value or the access message backoff parameter value based on the above considerations, the BS may consider the radio frequency (RF) implications of the values being assigned to the parameter.

While the present invention has been particularly shown and described with reference to particular embodiments thereof, it will be understood by those skilled in the art that various changes may be made and equivalents substituted for elements thereof without departing from the scope of the invention as set forth in the claims below. Accordingly, the specification and figures are to be regarded in an illustrative rather then a restrictive sense, and all such changes and substitutions are intended to be included within the scope of the present invention.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims. As used herein, the terms "comprises," "comprising," or any variation thereof, are intended to cover a non-exclusive inclusion, such that a process, method, article, or apparatus that comprises a list of elements does not include only those elements but may include other elements not expressly listed or inherent to such process, method, article, or apparatus. It is further understood that the use of relational terms, if any, such as first and second, top and bottom, and the like are used solely to distinguish one entity or action from another entity or action without necessarily requiring or implying any actual such relationship or order between such entities or actions.

What is claimed is:

1. A method for controlling access of a mobile station to a wireless communication network comprising:
   determining, by a mobile station, to convey an access message to a network;
   receiving, by the mobile station, an overhead message;
   waiting, by the mobile station and for a time period based on a wait for the overhead message, to convey the access message;
   determining, by the mobile station, one of more of whether to convey the access message subsequent to the waiting time period and when to convey the access message subsequent to the waiting time period, wherein determining whether to convey the access message based on the scaled random number comprises:
      comparing a value associated with the time period corresponding to a wait for an overhead message to a time threshold;
      when the value associated with the time period is less than the time threshold, determining whether to convey the access message based on the random number; and
      when the value associated with the time period is greater than the time threshold, determining whether to convey the access message based on the scaled random number.

2. The method of claim 1, wherein one of more of whether to convey the access message and when to convey the access message comprises:
   generating a random number;
   scaling the random number based on a time period corresponding to a wait for an overhead message to produce a scaled random number; and
   determining one of more of whether to convey the access message and when to convey the access message based on the scaled random number.

3. The method of claim 2, wherein determining whether to convey the access message based on the scaled random number comprises:
   comparing the scaled random number to a threshold value to produce a comparison; and
   determining whether to convey the access message based on the comparison.

4. The method of claim 2, wherein scaling comprises adjusting an access message transmission parameter based on a time period corresponding to a wait for an overhead message to produce an adjusted access message transmission parameter and scaling the random number based on the adjusted access message transmission parameter to produce a scaled random number.

5. The method of claim 2, wherein determining whether to convey the access message based on the scaled random number comprises:
   determining whether a random number threshold is non-zero; and
   when the random number threshold is non-zero, determining whether to convey the access message based on the scaled random number.

6. The method of claim 2, wherein determining when to convey the access message based on the scaled random number comprises:
   scaling the random number to generate a backoff value; and
   determining when to convey the access message based on the resulting backoff value.

7. The method of claim 6, wherein scaling comprises adjusting an access message backoff parameter based on a time period corresponding to a wait for an overhead message to produce an adjusted access message backoff parameter and scaling the random number based on the adjusted access message backoff parameter to produce a scaled random number.

8. The method of claim 1, wherein determining whether to convey the access message based on a time period corresponding to wait for an overhead message comprises:
   generating a random number;
   scaling a random number threshold based on the wait for an overhead message to produce a scaled random number threshold; and
   determining whether to convey an access message based on a comparison of the random number and the scaled random number threshold.

9. The method of claim 8, wherein scaling comprises adjusting an access message transmission parameter based on a time period corresponding to a wait for an overhead message to produce an adjusted access message transmission parameter and scaling the random number threshold based on the adjusted access message transmission parameter to produce a scaled random number threshold.

10. A method for controlling access of a mobile station to a wireless communication network comprising:
    determining to convey an access message to a network;
    waiting for an overhead message comprising system access information;
    executing a persistence test;
    determining a backoff period based on a time period corresponding to the wait for the overhead message;
    in response to a successful execution of the persistence test, holding off an initial transmission of the access message until expiration of the backoff period, wherein holding off transmission of the access message comprises:

comparing a value associated with the time period corresponding to a wait for an overhead message to a time threshold;

when the value associated with the time period is less than the time threshold, determining whether to convey the access message based on a persistence test without application of an additional backoff period; and when the value associated with the time period is greater than the time threshold, determining whether to convey the access message based on based on a persistence test and, in response to a successful execution of the persistence test, holding off transmission of the access message until expiration of the backoff period.

11. The method of claim 10, wherein determining a backoff period comprises determining a backoff period based on an access message backoff parameter.

12. The method of claim 11, wherein determining a backoff period comprises:

adjusting the access message backoff parameter based on a time period corresponding to the wait for the overhead message to produce an adjusted access message backoff parameter; and determining a backoff period based on the adjusted access message backoff parameter.

13. The method of claim 10, wherein holding off transmission of the access message comprises:

determining whether a random number threshold is non-zero; and when the random number threshold is non-zero, determining whether to convey the access message based on a persistence test and, in response to a successful execution of the persistence test, holding off transmission of the access message until expiration of the backoff period.

14. The method of claim 10, further comprising:

in response to a unsuccessful execution of the persistence test, re-executing a persistence test; and in response to a successful re-execution of the persistence test, holding off transmission of the access message until expiration of the backoff period wherein the backoff period is based on an access message backoff parameter.

15. The method of claim 14, wherein the backoff period is in addition to a sequence backoff delay.

16. A method for controlling wireless access to a communication network comprising:

generating one or more of an access message transmission parameter and an access message backoff parameter;

broadcasting a persistence value;

broadcasting the one or more of an access message transmission parameter and an access message backoff parameter in an overhead message; and wherein the access message transmission parameter value is used by a mobile station to scale a random number generated by the mobile station when executing a persistence test that comprises comparing the scaled random number and the broadcast persistence value to determine whether to transmit an access message and the access message backoff parameter value is used by a mobile station to determine a backoff period prior to initially transmitting an access message.

17. The method of claim 16, further comprising:

waiting for an overhead message comprising one or more of configuration information and access parameter information; and wherein generating one or more of an access message transmission parameter and an access message backoff parameter comprises generating one or more of an access message transmission parameter and an access message backoff parameter based on whether the mobile station is capturing the overhead message due to an idle handoff.

18. A mobile station comprising a processor that is configured to determine to convey an access message to a network, receive an overhead message, wait for a time period, based on a wait for the overhead message, to convey the access message, and determine one or more of whether to convey the access message subsequent to the waiting time period and when to convey the access message subsequent to the waiting time period, wherein the processor is configured to determine whether to convey the access message based on the scaled random number by comparing a value associated with the time period corresponding to a wait for an overhead message to a time threshold, when the value associated with the time period is less than the time threshold, determining whether to convey the access message based on the random number, and when the value associated with the time period is greater than the time threshold, determining whether to convey the access message based on the scaled random number.

19. The mobile station of claim 18, wherein the processor is configured to determine one or more of whether to convey the access message and when to convey the access message by generating a random number, scaling the random number based on a time period corresponding to a wait for an overhead message to produce a scaled random number, and determining one or more of whether to convey the access message and when to convey the access message based on the scaled random number.

20. The mobile station of claim 19, wherein the processor is configured to determine whether to convey the access message based on the scaled random number by comparing the scaled random number to a threshold value to produce a comparison and determining whether to convey the access message based on the comparison.

21. The mobile station of claim 19, wherein the processor is configured to scale the random number by adjusting an access message transmission parameter based on a time period corresponding to a wait for an overhead message to produce an adjusted access message transmission parameter and scaling the random number based on the adjusted access message transmission parameter to produce a scaled random number.

22. The mobile station of claim 19, wherein the processor is configured to determine whether to convey the access message based on the scaled random number by determining whether a random number threshold is non-zero and when the random number threshold is non-zero, determining whether to convey the access message based on the scaled random number.

23. The mobile station of claim 19, wherein the processor is configured to determine when to convey the access message based on the scaled random number by scaling the random number to generate a backoff value and determining when to convey the access message based on the resulting backoff value.

24. The mobile station of claim 23, wherein the processor is configured to scale the random number by adjusting an access message backoff parameter based on a time period corresponding to a wait for an overhead message to produce an adjusted access message backoff parameter and scaling the random number based on the adjusted access message backoff parameter to produce a scaled random number.

25. The mobile station of claim 18, wherein the processor is configured to determine whether to convey the access message based on a time period corresponding to wait for an overhead message by generating a random number, scaling a random number threshold based on the wait for an overhead message, and determining whether to convey an access message based on a comparison of the random number and the scaled random number threshold.

26. The mobile station of claim 25, wherein the processor is configured to scale a random number threshold by adjusting an access message transmission parameter based on a time period corresponding to a wait for an overhead message to produce an adjusted access message transmission parameter and scaling the random number threshold based on the adjusted access message transmission parameter to produce a scaled random number threshold.

27. A mobile station comprising a processor that is configured to determine to convey an access message to a network, wait for an overhead message comprising system access information, execute a persistence test, determine a backoff period based on a time period corresponding to the wait for the overhead message, and in response to a successful execution of the persistence test, hold off an initial transmission of the access message until expiration of the backoff period, wherein the processor holds off transmission of the access message by comparing a value associated with the time period corresponding to a wait for an overhead message to a time threshold, when the value associated with the time period is less than the time threshold, determining whether to convey the access message based on a persistence test without application of an additional backoff period, and, when the value associated with the time period is greater than the threshold, determining whether to convey the access message based on based on a persistence test and, in response to a successful execution of the persistence test, holding off transmission of the access message until expiration of the backoff period.

28. The mobile station of claim 27, wherein the processor determines a backoff period by determining a backoff period based on an access message backoff parameter.

29. The mobile station of claim 28, wherein the processor determines a backoff period by adjusting the access message backoff parameter based on a time period corresponding to the wait for the overhead message to produce an adjusted access message backoff parameter and determining a backoff period based on the adjusted access message backoff parameter.

30. The mobile station of claim 27, wherein the processor holds off transmission of the access message by determining whether a random number threshold is non-zero and when the random number threshold is non-zero, determining whether to convey the access message based on a persistence test and in response to a successful execution of the persistence test, holding off transmission of the access message until expiration of the backoff period.

31. The mobile station of claim 27, wherein the processor is further configured to, in response to a unsuccessful execution of the persistence test, re-execute a persistence test and in response to a successful re-execution of the persistence test, hold off transmission of the access message until expiration of the backoff period, wherein the backoff period is determined based on an access message backoff parameter.

32. A base station comprising a processor that is configured to generate one or more of an access message transmission parameter and an access message backoff parameter, broadcast a persistence value, and broadcast the one or more of an access message transmission parameter and an access message backoff parameter in an overhead message, wherein the access message transmission parameter value is used by a mobile station to scale a random number generated by the mobile station when executing a persistence test that comprises comparing the scaled random number and the broadcast persistence value to determine whether to transmit an access message and the access message backoff parameter value is used by a mobile station to determine a backoff period prior to transmitting an access message.

* * * * *